(12) United States Patent
Delos Reyes et al.

(10) Patent No.: US 9,569,595 B2
(45) Date of Patent: Feb. 14, 2017

(54) DYNAMIC MOBILE STREAMING APPLICATION SUPPRESSION

(75) Inventors: Emerando M. Delos Reyes, Pleasant Hill, CA (US); Samir Ait-Ameur, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1560 days.

(21) Appl. No.: 12/905,849

(22) Filed: Oct. 15, 2010

(65) Prior Publication Data

US 2012/0096538 A1    Apr. 19, 2012

(51) Int. Cl.
| | |
|---|---|
| G06F 21/00 | (2013.01) |
| G06F 21/10 | (2013.01) |
| H04L 29/12 | (2006.01) |
| H04W 8/26 | (2009.01) |
| H04L 29/14 | (2006.01) |

(52) U.S. Cl.
CPC .............. *G06F 21/10* (2013.01); *G06F 21/00* (2013.01); *H04L 61/103* (2013.01); *H04L 61/2076* (2013.01); *H04L 69/40* (2013.01); *H04W 8/26* (2013.01)

(58) Field of Classification Search
CPC ........... G06F 21/10; G06F 21/00; G06F 15/16
USPC ............................ 726/12; 709/224; 455/411
See application file for complete search history.

(56) References Cited

U.S. PATENT DOCUMENTS

| | | | |
|---|---|---|---|
| 2006/0009214 A1* | 1/2006 | Cardina et al. | 455/432.3 |
| 2006/0265507 A1* | 11/2006 | Banga et al. | 709/228 |
| 2008/0049638 A1* | 2/2008 | Ray et al. | 370/252 |

* cited by examiner

*Primary Examiner* — Jeffrey Pwu
*Assistant Examiner* — Samuel Ambaye (57) ABSTRACT

A method performed by a network device may include obtaining an Internet Protocol address and a user device identifier associated with a user device, determining that the obtained user device identifier does not match a previous user device identifier associated with the obtained Internet Protocol address, and monitoring packets destined for the obtained Internet Protocol address to determine whether the packets are associated with a streaming application, based on determining that the obtained user device identifier does not match the previous user device identifier. The method may further include detecting a packet destined for the obtained Internet Protocol address, where the packet is associated with a streaming application and where the packet is received from a particular network device and signaling the particular network device to stop sending packets associated with the streaming application and destined for the obtained Internet Protocol address.

20 Claims, 7 Drawing Sheets

DYNAMIC MOBILE STREAMING APPLICATION SUPPRESSION

BACKGROUND INFORMATION

Mobile wireless communication devices continue to increase in popularity, leading to increasing numbers of users and to demands for more services and higher data rates. In order to satisfy the needs of users and to improve service, providers of mobile wireless communication services continue to improve wireless access networks used to deliver services for users of mobile communication devices. One aspect of such improvements may relate to management of streaming applications. A streaming application may provide real-time content to a user, such as real-time audio and/or video content. Managing data associated with streaming applications in a wireless network may prove to be quite challenging.

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

Figure 1:
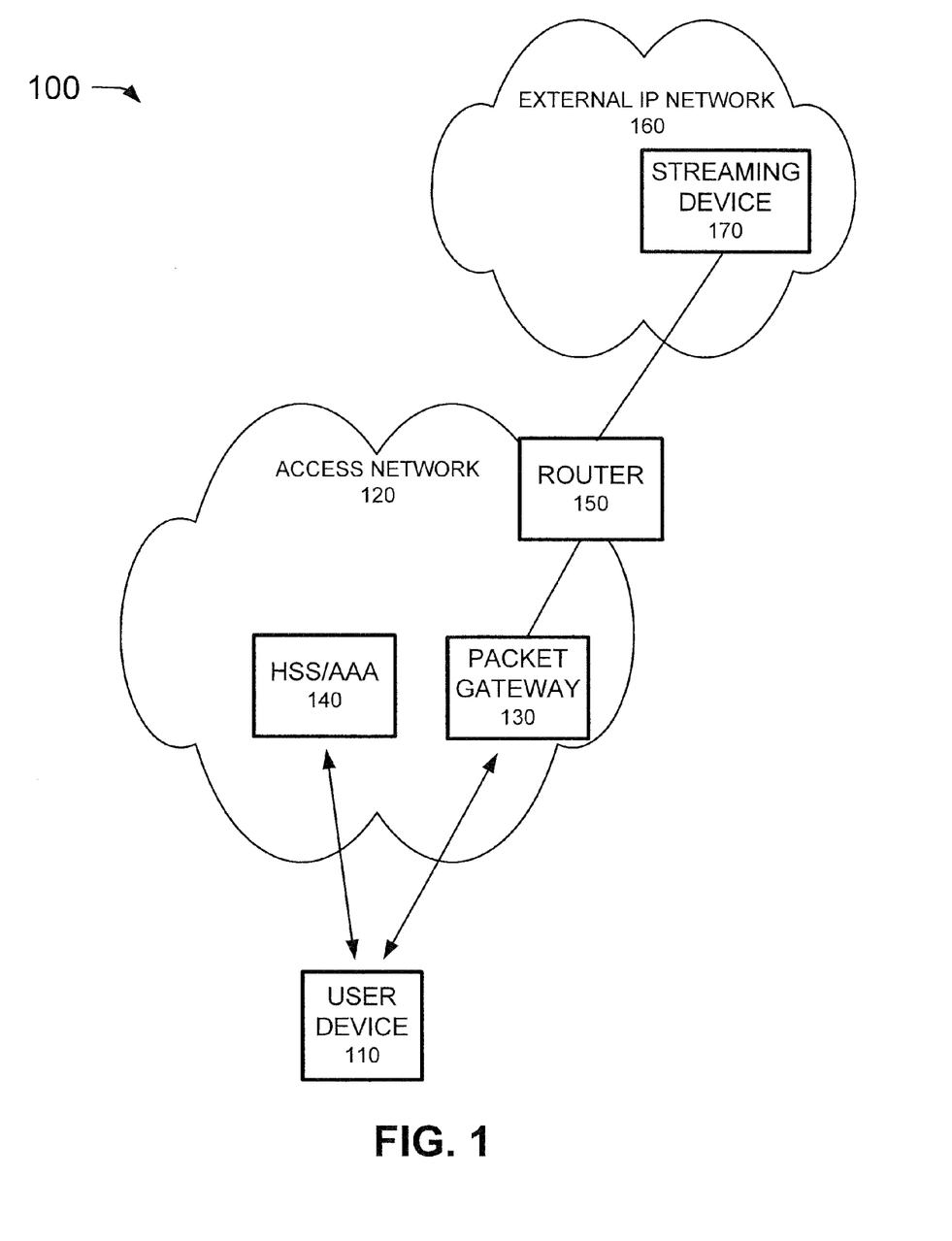
FIG. 1 is a diagram illustrating an example of components of a system according to an implementation described herein.

FIG. 1 is a diagram illustrating example components of system 100 according to an implementation described herein. As shown in FIG. 1, system 100 may include a user device 110, an access network 120, and an external Internet Protocol (IP) network 160.

User device 110 may include any wireless communication device that a user may use to connect to access network 120. User device 110 may include, for example, a mobile communication device, such as a mobile phone, a personal digital assistant (PDA), or a media playing device with communication capabilities; a desktop device, such as a personal computer or a workstation; a laptop computer; a telephone terminal; a set-top box, television, network access point, or a gaming console; or any other communication device or combinations thereof.

Access network 120 may include one or more devices that implement logical entities interconnected via standardized interfaces, and that provide wireless packet-switched services and wireless IP connectivity to user device 110 for both data and voice services. Access network 120 may allow the delivery of broadband IP services and may interface with external IP network 160. Access network 120 may include a code division multiple access (CDMA) network (e.g., a one times radio transmission technology (1×RTT) CDMA network, a High Rate Packet Data (HRPD) CDMA network (which may include an evolution data optimized (EV-DO) network), or an enhanced HRPD (eHRPD) CDMA network); a network based on a Global System for Mobile Communication (GSM) standard (e.g., an Enhanced Data Rates for GSM Evolution (EDGE) network, a Universal Mobile Telecommunications System (UMTS) network (also known as a wideband CDMA (W-CDMA) network), or a High Speed Packet Access (HSPA) network); and/or a Long Term Evolution (LTE) network (e.g., an evolved packet core (EPC) network based on the LTE standard specified by the $3^{rd}$ Generation Partnership Project (3GPP)). An LTE access network may include one or more devices that implement logical entities interconnected via standardized interfaces and that provide packet-switched services between user device 110 and external IP network 160.

Access network 120 may include one or more base stations (not shown in FIG. 1) for receiving and transmitting wireless signals to and from user device 110, a packet gateway 130, a home subscriber server (HSS) device and/or an authentication, authorization, and accounting (AAA) server device 140 (shown together as one device in FIG. 1), and a router 150.

Packet gateway 130 may include one or more devices that function as a gateway to an IP network (e.g., external IP network 160). Packet gateway 130 may select an available IP address from a pool of IP addresses and assign the selected IP address to user device 110. When user device 110 disconnects from access network 120 and/or loses connection with packet gateway 130, packet gateway 130 may return the selected IP address to the pool of available IP addresses.

HSS/AAA 140 may include one or more devices that function as a HSS for access network 120 and/or that act as an AAA server for access network 120. For example, HSS/AAA 140 may store information associated with a subscriber, services that the subscriber has requested or been assigned and settings associated with the services, and/or a current location of the subscriber. Furthermore, HSS/AAA 140 may verify a subscriber's identity, authenticate and/or authorize a user device 110 using a user device identification number (e.g., by performing MAC authentication), authorize a particular service, and/or track consumption of network resources for a particular subscriber.

Router 150 may include one or more devices that function as a routing device between packet gateway 130 and external IP network 160. While a single router 150 is depicted in FIG. 1, a routing path between packet gateway 130 and external IP network 160 may include multiple routers 150. In one implementation, router 150 may include an edge router that acts as a gateway and/or firewall for access network 120 and that connects access network 120 to external IP network 160. In another implementation, router 150 may not include an edge router.

External IP network 160 may include any packet-based communication network. For example, external IP network 160 may include a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of these networks or other types of networks.

External IP network 160 may include a streaming device 170. Streaming device 170 may include one or more devices that run streaming applications and that provide streaming data packets to user device 110. A streaming application may include any application that provides real-time audio and/or video data to user device 110. Examples of streaming applications may include live or pre-recorded Internet Radio stations (e.g., Pandora Radio, Jango, etc), live or pre-recorded television programs (e.g., Hulu, Joust, etc.), on-demand movies (e.g., Epix, Netflix, etc.), podcasts (e.g., itunes, etc.), or any other type of real-time audio and/or video content. Streaming device 170 may receive a request for streaming content from user device 110 via, for example, a streaming application installed on user device 110, or via a user navigating to a web page associated with streaming device 170. Streaming device 170 may continue to provide streaming content to user device 110 until user device 110 terminates a streaming application or leaves a web page associated with streaming device 170. If user device 110 loses a connection with packet gateway 130 without terminating the streaming application or leaving the web page associated with streaming device 170, streaming device 170 may not be aware of the lost connection and may continue to provide streaming content to an IP address associated with user device 110.

Although FIG. 1 shows example components of system 100, in other implementations, system 100 may include fewer components, different components, differently arranged components, or additional components than depicted in FIG. 1. Additionally or alternatively, one or more components of system 100 may perform the tasks described as being performed by one or more other components of system 100.

Figure 2A:
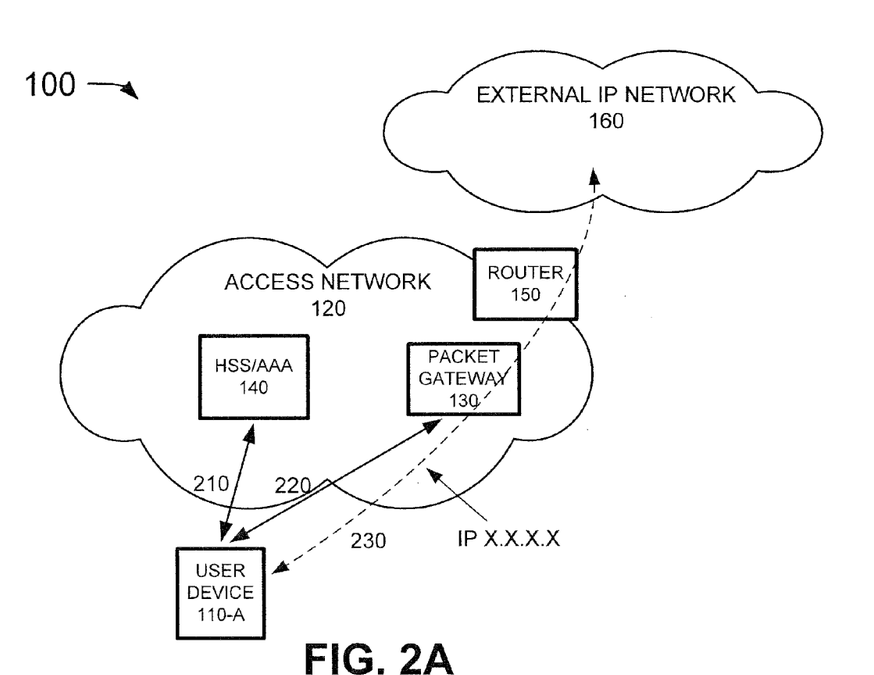
FIGS. 2A and 2B are diagrams illustrating an example of an Internet Protocol (IP) address reassignment according to an implementation described herein.
Figure 2B:
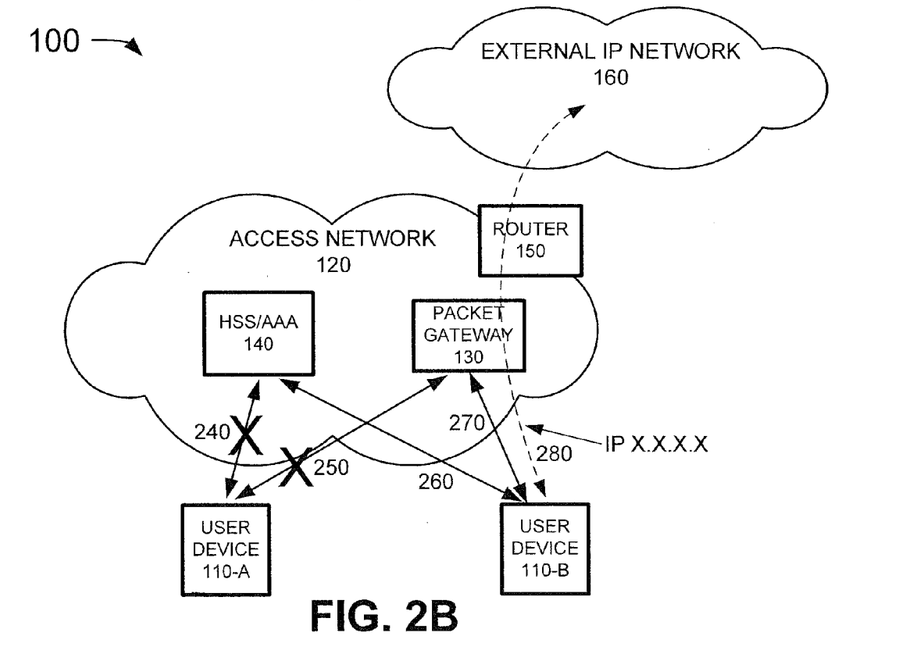

FIGS. 2A and 2B are diagrams illustrating an example of an IP address re-assignment according to an implementation described herein. As shown in FIG. 2A, user device 110-A may attach to access network 120 and authenticate, using a user device identifier, with HSS/AAA 140 (item 210). The user device identifier may correspond to a media access control (MAC) address associated with user device 110, an electronic serial number associated with user device 110, a card identification number associated with a subscriber identity module (SIM) card installed in user device 110, or any other identifier that uniquely identifies user device 110 to access network 120.

Packet gateway 130 may be assigned a pool of available IP addresses and packet gateway 130 may select an IP address to assign to a user device from the pool of IP addresses when the user device attaches to access network 120. The IP address assigned to the user device may uniquely designate a network identity to the user device. As packet gateway 130 may have a limited set of IP addresses available, IP address exhaustion may occur as user devices attach to access network 120. Therefore, packet gateway 130 may recycle an IP address once the IP address is no longer needed and may reassign the IP address if the user device associated with the IP address is no longer connected to access network 120.

For example, packet gateway 130 may select IP address X.X.X.X as an available IP address from a pool of IP addresses and may assign IP address X.X.X.X to user device 110-A. As a result, user device 110-A may establish IP connectivity between packet gateway 130 and user device 110-A (item 220). User device 110-A may then proceed to communicate with external IP network 160 using IP address X.X.X.X (item 230). For example, user device 110-A may access a mobile streaming application at streaming device 170 (not shown in FIG. 2A).

As shown in FIG. 2B, at a later time, user device 110-A may lose connectivity with HSS/AAA 140 (item 240) and/or may lose connectivity with packet gateway 130 (item 250). For example, user device 110-A may detach from access network 120, may enter an area where signals from user device 110-A cannot reach any base stations associated with access network 120, may cancel or lose a subscription through a provider associated with access network 120, etc. As a result of losing connection to packet gateway 130, IP address X.X.X.X may be returned to the IP pool assigned to packet gateway 130. For example, packet gateway 130 may attempt to contact user device 110-A, may not receive a response within a particular time interval, may determine that user device 110-A cannot be reached, and may return IP address X.X.X.X to the pool of available IP addresses.

At some later time, user device 110-B may attach to access network 120 and authenticate using a user device ID number (e.g., a MAC address), associated with user device 110-B, with HSS/AAA 140 (item 260). Packet gateway 130 may then assign IP address X.X.X.X to user device 110-B and may establish IP connectivity between packet gateway 130 and user device 110-B (item 270). User device 110-B may then proceed to communicate with external IP network 160, or with another IP network, using IP address X.X.X.X (item 280). Thus, IP address X.X.X.X may be recycled by packet gateway 130 to prevent packet gateway 130 from exhausting a pool of available IP addresses.

User device 110-A may have activated a streaming application, which caused streaming device 170 to send streaming data packets to user device 110. If user device 110-A loses a connection with gateway packet 130 without properly terminating the streaming application, streaming device 170 may persist in communicating with IP address X.X.X.X and may continue to send streaming data packets to IP address X.X.X.X, which may now be assigned to user device 110-B. Normally, unsolicited packets may be dropped by a firewall associated with access network 120 (e.g., router 150 may act as a firewall). However, in this situation, the packets being sent by streaming device 170 to IP address X.X.X.X are solicited, because user device 110-A has requested the packets by activating the streaming application associated with streaming device 170. The streaming data packets sent to user device 110-B via IP address X.X.X.X may be irrelevant to user device 110-B and may utilize network bandwidth.

An implementation described herein may relate to suppressing and/or stopping any streaming application that may persist when a user device, associated with a particular IP address, loses a connection to an access network without terminating the streaming application and when the particular IP address is reassigned to a different user device connected to the access network. An implementation described herein may further relate to detecting that a user device, associated with a particular IP address, has activated a streaming application, determining that a streaming application has been suppressed in association with the particular IP address, and clearing the suppression of the streaming application associated with the particular IP address.

Although FIGS. 2A and 2B show example action items which may be involved in re-assignment of an IP address, in other implementations, re-assignment of IP addresses may include fewer action items, different action items, differently arranged action items, or additional action items than depicted in FIGS. 2A and 2B. Additionally or alternatively, one or more action items depicted in FIGS. 2A and 2B may include tasks described as being performed by one or more other of the action items depicted in FIGS. 2A and 2B.

Figure 3:
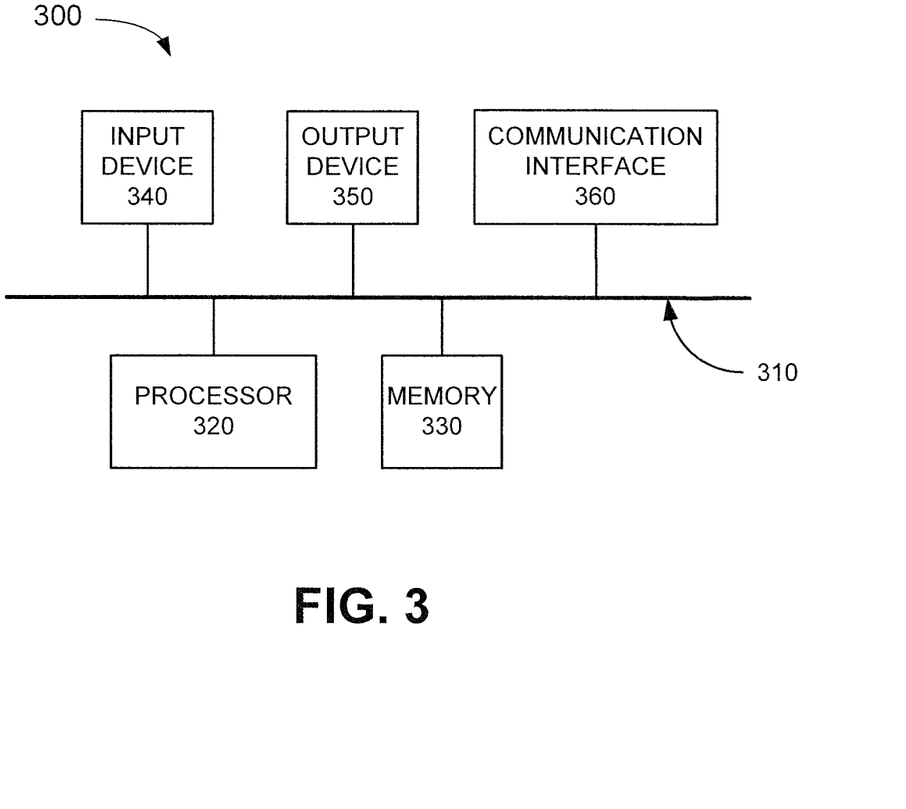
FIG. 3 is a diagram illustrating an example of components of a packet gateway or a router according to an implementation described herein.

FIG. 3 is a diagram illustrating example components of a device 300 that may correspond to packet gateway 130, HSS/AAA 140, and/or router 150. Each of packet gateways 130, HSS/AAA 140, and/or router 150 may include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include one or more processors, microprocessors, or processing logic (e.g., application specific integrated circuits (ASICs) or field programmable gate arrays (FPGAs)) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to device 300, such as a keypad, a button, a pen, a touch screen, voice recognition and/or biometric mechanisms, etc. Output device 350 may include a mechanism that outputs information to the operator, including a display, a speaker, etc.

Communication interface 360 may include any transceiver-like mechanism that enables device 300 to communicate with other devices and/or systems, such as for communicating with a base station, or with external IP network 160. For example, communication interface 360 may include a modem, a network interface card, and/or a wireless interface card.

As will be described in detail below, device 300 may perform certain operations. Device 300 may perform these operations in response to processor 320 executing software instructions contained in a computer-readable medium, such as memory 330. A computer-readable medium may be defined as one or more logical or physical memory devices. A logical memory device may include space within a single physical memory device or spread across multiple physical memory devices.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of a device, in other implementations, device 300 may contain fewer components, different components, additional components, or differently arranged components than depicted in FIG. 3. Additionally or alternatively, one or more components of device 300 may perform one or more tasks described as being performed by one or more other components of device 300.

Figure 4:
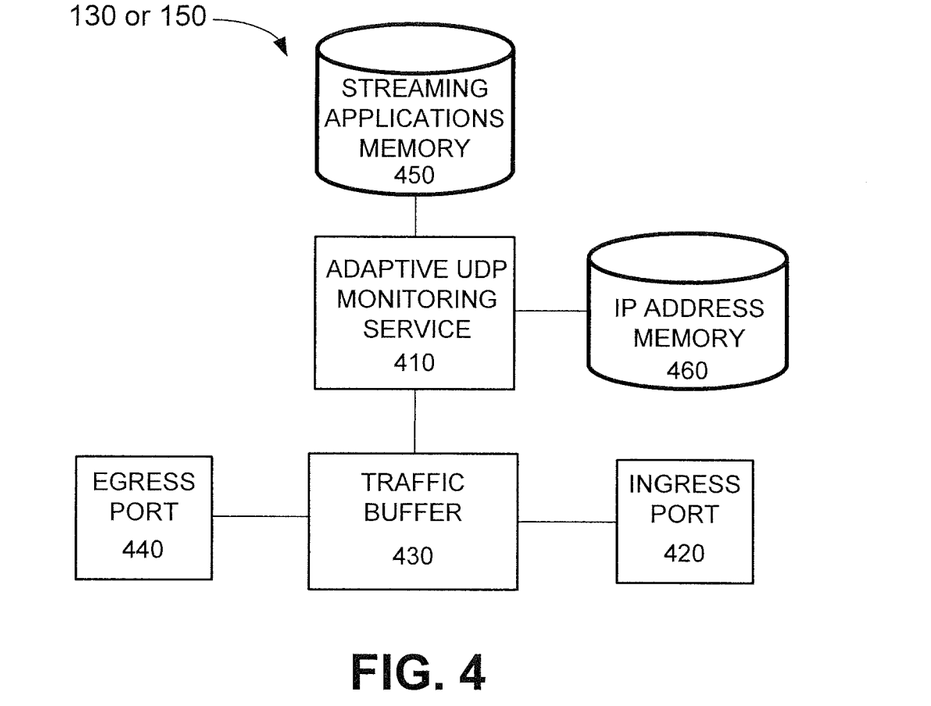
FIG. 4 is a diagram illustrating an example of functional components of a packet gateway according to an implementation described herein.

FIG. 4 is a diagram illustrating example functional components of packet gateway 130 or router 150 according to an implementation described herein. As shown in FIG. 4, packet gateway 130 or router 150 may include an adaptive User Datagram Protocol (UDP) monitoring service (AUMS) 410, one or more ingress ports 420 (referred to herein collectively as "ingress ports 420" and individually as "ingress port 420"), one or more traffic buffers 430 (referred to herein collectively as "traffic buffers 430" and individually as "traffic buffer 430"), one or more egress ports 440 (referred to herein collectively as "egress ports 440" and individually as "egress port 440"), a streaming applications memory 450, and an IP address memory 460.

AUMS 410 may detect when packet gateway 130 assigns an IP address to user device 110 and may obtain the IP address along with a user device identifier associated with user device 110. AUMS 410 may access IP address memory 460 and determine whether the obtained user device identifier, associated with the IP address, matches a stored user device identifier, associated with the IP address. If the obtained user device identifier does not match the stored user device identifier, AUMS 410 may determine that the IP address has been assigned to a new user device and may monitor for packets destined for the IP address to determine whether the packets are associated with a streaming application.

In one implementation, AUMS 410 may monitor UDP packets destined for the IP address. UDP is a protocol that may send packets without an implicit hand-shaking dialogue and may not perform any reliability or error correction, thereby avoiding unnecessary overhead processing. For example, using UDP, a network node may drop packets rather than waiting for a delayed packet. Because of these properties, UDP may be used for sending real-time data, such as for voice-over-IP (VoIP) applications, online game applications, or streaming applications. Therefore, monitoring UDP packets (also known as "datagrams") may be sufficient for identifying packets associated with streaming data applications. In another implementation, AUMS 410 may monitor packets associated with different, or additional, protocols.

When AUMS 410 identifies a UDP packet, AUMS 410 may determine whether the packet is associated with a streaming application. For example, AUMS 410 may examine headers of higher layer packets included in UDP packets to determine whether the packets are associated with a streaming application. For example, a streaming application may use a transport layer protocol, such as Real-Time Transport Protocol (RTP), Stream Control Transmission Protocol (SCTP), and/or Datagram Congestion Control Protocol (DCCP) on top of UDP; and may use an application layer, with an application-specific packet format, on top of a transport layer protocol. AUMS 410 may, for example, examine headers of application layer packets to identify whether a packet is associated with a streaming application, by comparing the information in the headers of application layer packets with information stored in streaming applications memory 450.

If AUMS 410 detects a packet, which is destined for the IP address and which is associated with a streaming application, AUMS 410 may signal a network device (e.g., router 150) from which the packet was received to stop forwarding streaming application packets to the IP address. For example, AUMS 410 may identify a source IP address associated with the streaming application and may signal to the network device to stop forwarding packets that are destined for the IP address and that originate from the source IP address.

In one implementation, AUMS 410 may be implemented in gateway device 130. In another implementation, AUMS 410 may be implemented in router 150. In yet another implementation, AUMS 410 may be implemented in another device, or a combination of devices, such as any network node or nodes that may participate in routing streaming data packets from streaming device 170 to user device 110.

Ingress ports 420 may receive incoming packets from other network devices. For example, ingress ports 420 may receive packets from user device 110 and/or may receive packets from router 150. Traffic buffer 430 may temporarily store packets which were received by ingress ports 420. Egress ports 440 may transmit outgoing packets to other network devices. For example, egress ports 440 may transmit packets to user device 110 and/or may transmit packets to router 150.

Streaming applications memory 450 may store information about particular streaming applications. For example, streaming applications memory 450 may store header information associated with particular streaming applications, source IP addresses associated with particular streaming applications, and/or any other information that may be used to identify a packet as being associated with a streaming application.

IP address memory 460 may store information associated with particular IP addresses from the pool of IP addresses assigned to packet gateway 130. Example fields that may be included in IP address memory 460 are described below with reference to FIG. 5.

Although FIG. 4 shows example functional components of packet gateway 130 or router 150, in other implementations, packet gateway 130 or router 150 may contain fewer functional components, different functional components, differently arranged functional components, or additional functional components than depicted in FIG. 4. Additionally or alternatively, one or more functional components of packet gateway 130 or router 150 may perform one or more other tasks described as being performed by one or more other functional components of packet gateway 130 or router 150.

Figure 5:
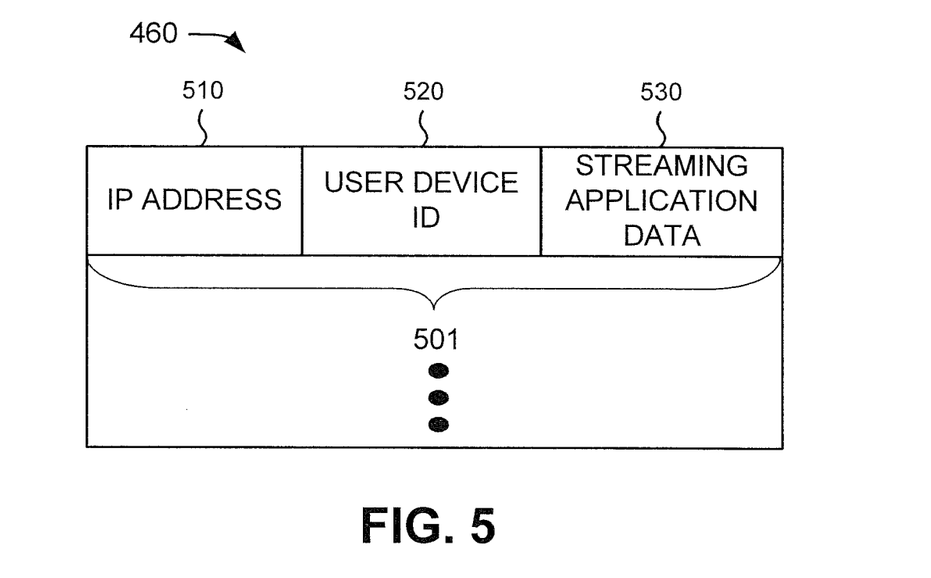
FIG. 5 is a diagram of example fields that may be stored within an IP address memory according to an implementation described herein.

FIG. 5 is a diagram of example fields that may be stored within IP address memory 460 according to an implementation described herein. In one implementation, IP address memory 460 may be implemented in a storage device included as part of memory 330 of packet gateway 130 or router 150. In another implementation, IP address memory 460 may be stored in a memory associated with another device or a group of devices, separate from or including memory 330 of packet gateway 130 or router 150. As shown in FIG. 5, IP address memory 460 may include one or more IP address records 501 (referred to herein collectively as "IP address records 501" and individually as "IP address record 501"). IP address record 501 may store information associated with a particular IP address. IP address record 501 may include an IP address field 510, a user device identification (ID) field 520, and a streaming application data field 530.

IP address field 510 may store information identifying a particular IP address. For example, IP address field 510 may store a 32 bit number associated with IP version 4 (Ipv4) and/or a 128 bit number associated with IP version 6 (IPv6).

User device ID field 520 may store a user device identifier that uniquely identifies a particular user device to access network 120, where the particular user device was last assigned the IP address stored in IP address field 510. In one implementation, user device ID field 520 may store a MAC address associated with the particular user device. In another implementation, user device ID field 520 may store a different user device identifier, such as an electronic serial number associated with the particular user device, a card identification number associated with a SIM card installed in the particular user device, a globally unique temporary identifier (GUTI) assigned to the particular user device by access network 110, or any other identifier that uniquely identifies the particular user device to access network 120.

Streaming application data field 530 may store information associated with a streaming application associated with the particular IP address. For example, streaming application data field 530 may store information about whether or not packets associated with a streaming application have been received for the particular IP address; information associated with a particular streaming application for which packets have been received for the particular IP address, such as information found in streaming data packets associated with the particular streaming application; whether a particular router has been signaled to stop forwarding streaming data packets for the particular IP address, a source IP address associated with a particular streaming application; and/or any other information associated with one or more streaming applications associated with the particular IP address.

Although FIG. 5 shows example fields of IP address memory 460, in other implementations, IP address memory 460 may contain fewer fields, different fields, additional fields, or differently arranged fields than depicted in FIG. 5. Additionally or alternatively, one or more fields of IP address memory 460 may include information described as being included in one or more other fields of IP address memory 460.

Figure 6:
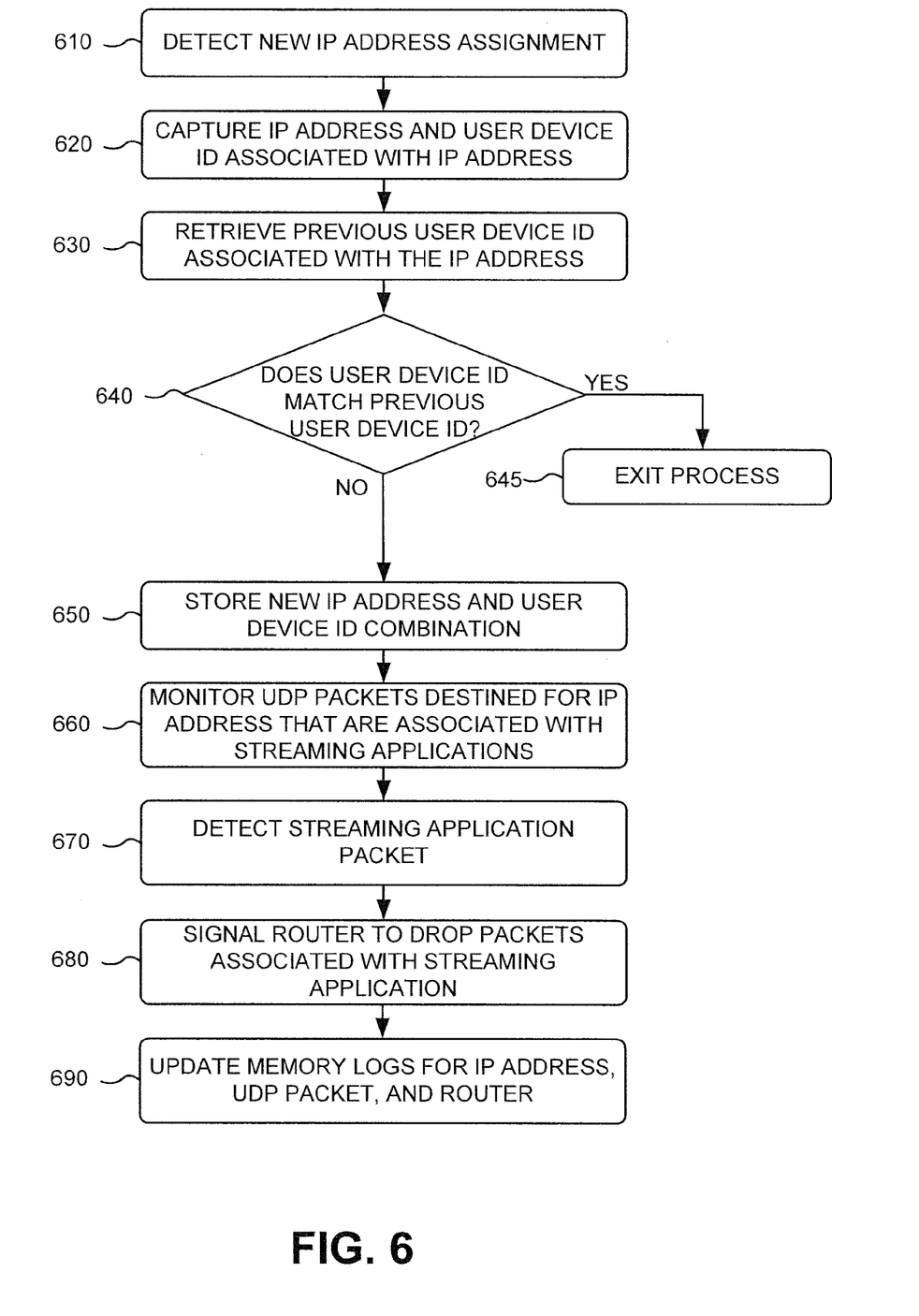
FIG. 6 is a flow diagram illustrating a first process for suppressing a streaming application according to an implementation described herein.

FIG. 6 is a flow diagram illustrating a first process for suppressing a streaming application according to an implementation described herein. In one implementation, the process of FIG. 6 may be performed by packet gateway 130 or router 150. In other implementations, some or all of the process of FIG. 6 may be performed by another device or a group of devices separate and/or possibly remote from or including packet gateway 130 or router 150.

The process of FIG. 6 may include detecting a new IP address assignment (block 610). For example, AUMS 410 may detect that packet gateway 130 has assigned a new IP address to user device 110. An new IP address may be assigned to user device 110 by packet gateway 130 by selecting an available IP address from a pool of IP addresses assigned to packet gateway 130. An IP address and a user device identifier associated with the IP address may be obtained (block 620). For example, AUMS 410 may obtain the assigned IP address and may retrieve a user device identifier associated with the user device from HSS/AAA 140. In one implementation, AUMS 410 may request the user device identifier from HSS/AAA 140 in response to detecting an new IP address assignment. In another implementation, HSS/AAA 140 may provide the user device identifier to AUMS 410 in response to authenticating user device 110.

In one implementation, the user device identifier may correspond to a MAC address associated with user device 110, which may have been provided to HSS/AAA 140 during MAC authentication. In another implementation, the user device identifier may correspond to a different type of user device identifier, such as a serial electronic number associated with user device 110, a card identification number associated with a SIM installed in user device 110, or a GUTI assigned to user device 110 my access network 120 (e.g., by a mobility management entity (MME) of access network 120 corresponds to an LTE network).

A previous user device identifier associated with the IP address may be retrieved (block 630). For example, AUMS 410 may retrieve the user device identifier stored in user device identifier field 520 of IP address record 501 associated with the obtained IP address.

A determination may be made as to whether the obtained user device identifier matched the previous user device identifier associated with the IP address (block 640). For example, AUMS 410 may compare the obtained user device identifier with the retrieved user device identifier. If it is determined that the obtained MAC address matches the previous MAC address associated with the IP address (block 640—YES), the process may be exited (block 645). Since, in this case, the user device associated with the IP address is the same as a previous user device to which the IP address was assigned, there may be no need to monitor UDP packets for packets associated with a streaming application, since unsolicited streaming data packets destined for the IP address may not be arriving. Thus, AUMS 410 may exit the process of monitoring packets associated with the obtained IP address.

If it is determined that the obtained user device identifier does not match the previous user device identifier associated with the IP address (block 640—NO), the new IP address and user device identifier combination may be stored (block 650). For example, AUMS 410 may store the new user device identifier in user device identifier field 510 of IP address record 501 associated with the IP address.

UDP packets destined for the IP address may be monitored to determine whether the packets are associated with streaming applications (block 660). For example, AUMS 410 may examine any UDP packet with a destination address that corresponds to the IP address. AUMS 410 may examine, for example, headers associated with transport layer and/or application layer protocol packets encapsulated within UDP packets, and may compare the header information with information stored in streaming applications memory 450.

A streaming application packet may be detected (block 670). For example, AUMS 410 may identify a particular UDP packet, with a destination address corresponding to the obtained IP address, as being associated with streaming device 170. A router may be signaled to drop packets associated with the streaming application (block 680). For example, AUMS 410 may identify router 150 as a source network node that sent the UDP packet to gateway device 130 by examining the header of the UDP packet. AUMS 410 may send a signal to router 150, instructing router 150 not to forward any packets with a destination address that corresponds to the obtained IP address and a source address corresponding to an IP address associated with streaming device 170. In response to receiving the signal, router 150 may drop subsequent packets from streaming device 170.

Memory logs for the IP address, UDP packet, and router may be updated (block 690). For example, AUMS 410 may store information identifying streaming device 170 and router 150, along with information indicating that a signal has been sent to router 150, in streaming application data field 530 of IP address record 501 associated with the obtained IP address.

While not shown in FIG. 6, in one implementation, AUMS 410 may send a signal to streaming device 170 to close the streaming application activated by user device 110, in response to detecting a streaming application packet associated with the obtained IP address. In another implementation, AUMS 410 may not send a signal to streaming device 170 to close the streaming application.

Figure 7:
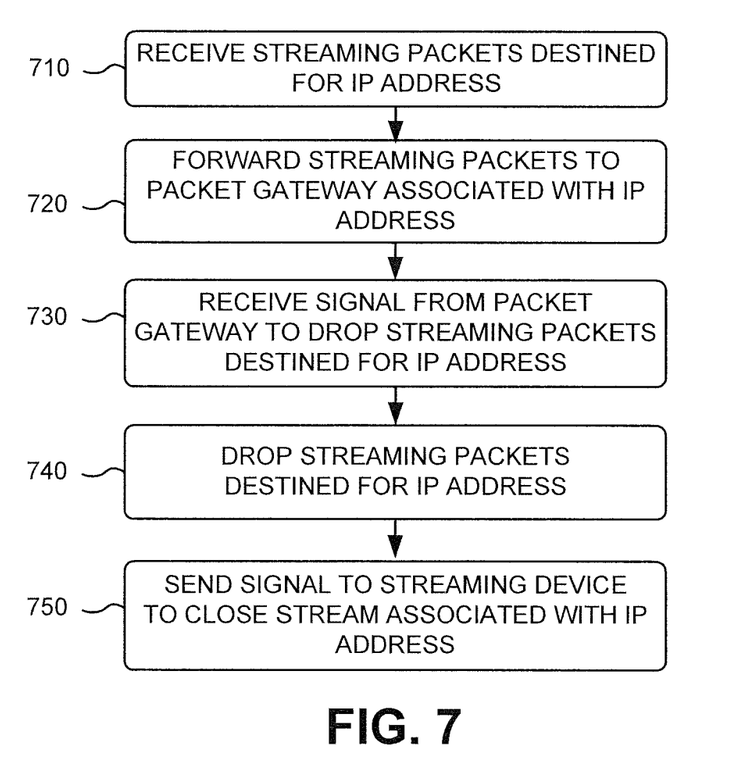
FIG. 7 is flow diagram illustrating a second process for suppressing a streaming application according to an implementation described herein.

FIG. 7 is flow diagram illustrating a second process for suppressing a streaming application according to an implementation described herein. In one implementation, the process of FIG. 7 may be performed by router 150. In other implementations, some or all of the process of FIG. 7 may be performed by another device or a group of devices separate and/or possibly remote from or including router 150.

The process of FIG. 7 may include receiving streaming packets destined for an IP address (block 710). For example, router 150 may receive streaming packets from streaming device 170 with a destination address corresponding to the IP address assigned to user device 110. The streaming packets may be forwarded to a packet gateway associated with the IP address (block 720). For example, router 150 may route the streaming packets to packet gateway 130, or to another network router associated with a network path to packet gateway 130.

A signal may be received from a packet gateway to drop streaming packets destined for the IP address (block 730). For example, router 150 may receive a signal from packet gateway 130, instructing router 150 to drop packets that include a destination address that corresponds to the obtained IP address and that include a source address corresponding to an IP address associated with streaming device 170.

Streaming packets destined for the IP address may be dropped (block 740). For example, in response to receiving the signal to drop streaming packets destined for the IP address, router 150 may drop any packets received from streaming device 170 and destined for the obtained IP address. Router 150 may determine that a packet corresponds to a streaming packet destined for the obtained IP address by examining the source address and destination address of the packet. If the source address of the packet corresponds to the IP address associated with the streaming application and if the destination address of the packet corresponds to the obtained IP address associated with user device 110, router 150 may drop the packet.

A signal may be sent to a streaming device to close a stream associated with the IP address (block 750). In one implementation, router 150 may send a signal to streaming device 170 to close the streaming application associated with the obtained IP address. In another implementation, router 150 may not send a signal to streaming device 170 to close the streaming application.

Figure 8:
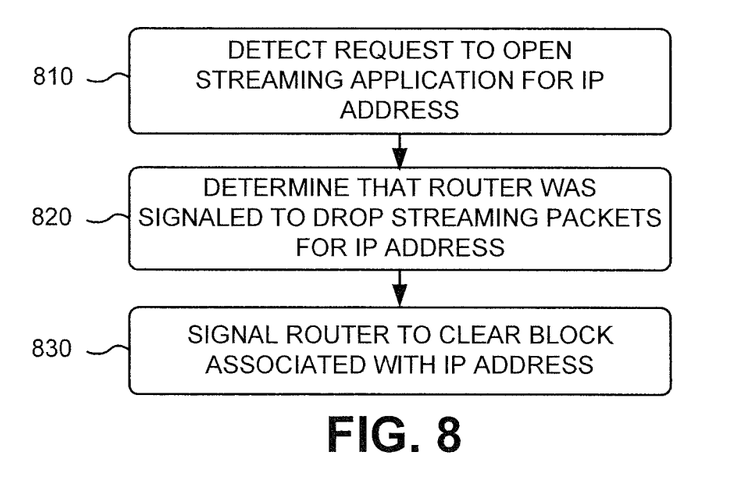
FIG. 8 is a flow diagram illustrating a process for clearing a suppression associated with an IP address according to an implementation described herein.

FIG. 8 is a flow diagram illustrating a process for clearing a suppression associated with an IP address according to an implementation described herein. In one implementation, the process of FIG. 8 may be performed by packet gateway 130 or router 150. In other implementations, some or all of the process of FIG. 8 may be performed by another device or a group of devices separate and/or possibly remote from or including packet gateway 130 or router 150.

The process of FIG. 8 may include detecting a request to open a streaming application for an IP address (block 810).

For example, AUMS 410 may detect that user device 110 has requested to open a streaming application associated with streaming device 170. AUMS 410 may monitor, for example, packets received from any user device that has been assigned an IP address which has been associated with a suppressed streaming application, and may monitor headers of transport layer or application layer packets associated with the IP address to determine whether the packets are associated with a request to activate a streaming application.

A determination may be made that a router was signaled to drop packets destined for the IP address (block 820). For example, AUMS 410 may determine that user device 110, assigned a particular IP address, has requested to activate a streaming application associated with streaming device 170 and that router 150, which is associated with a routing path to streaming device 170, has been instructed to drop packets from streaming device 170 destined for the particular IP address. AUMS 410 may determine this fact by accessing streaming application data field 530 associated with the particular IP address.

The router may be signaled to clear a block associated with the IP address (block 830). For example, AUMS 410 may send a signal to router 150, instructing router 150 to resume forwarding packets from streaming device 170 to the particular IP address.

Figure 9:
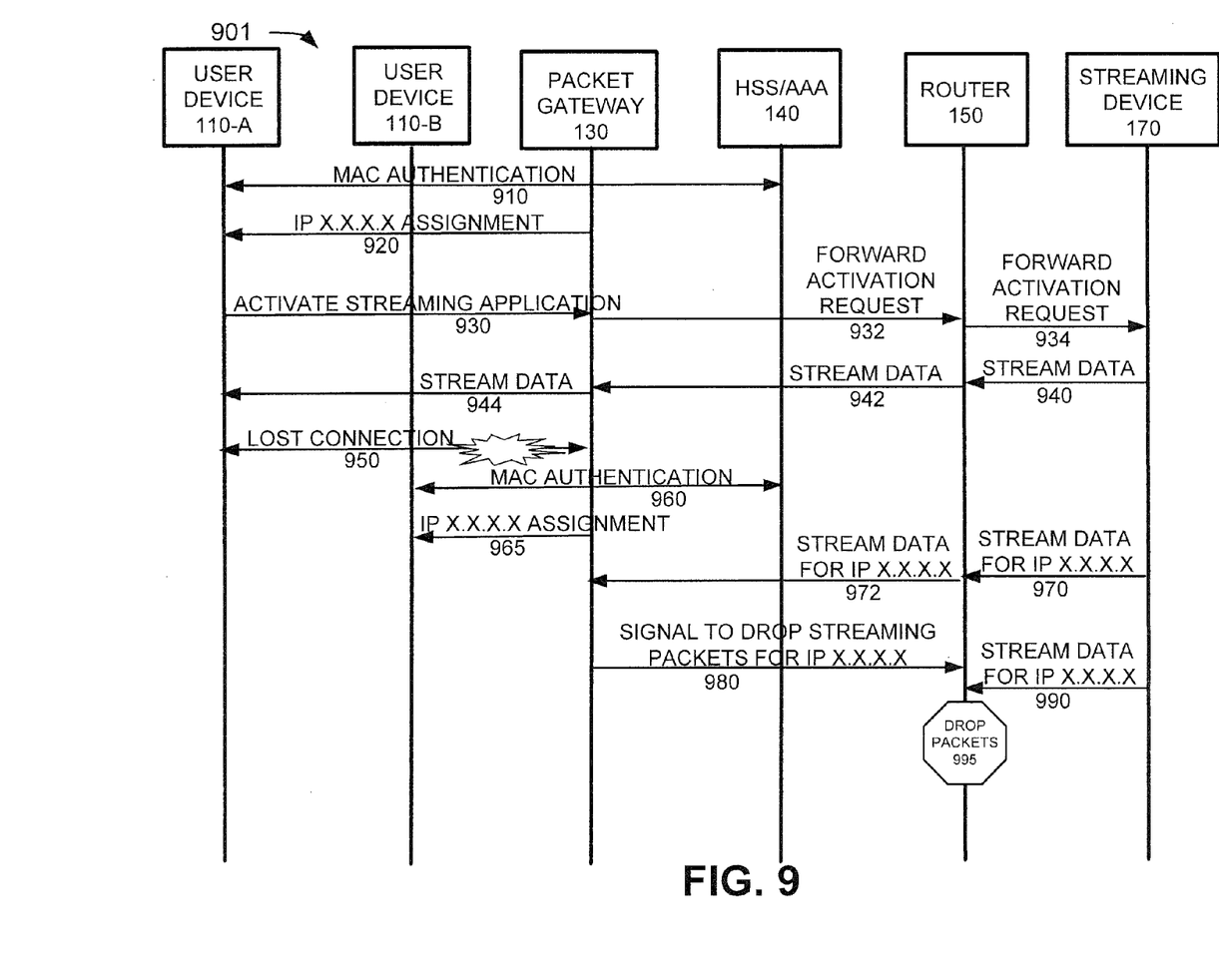
FIG. 9 is a diagram illustrating an example signal flow according to an implementation described herein.

FIG. 9 is a diagram illustrating an example signal flow 901 according to an implementation described herein. Signal flow 901 illustrates the processes of FIGS. 6 and 7 in the context of system 100. Signal flow 901 may include user device 110-A attaching to access network 120 and performing a MAC authentication with HSS/AAA 140 (signal 910). Packet gateway 130 may assign IP address X.X.X.X to user device 110-A, by selecting an available IP address from a pool of IP addresses assigned to packet gateway 130 (signal 920). User device 110-A may now have IP connectivity with packet gateway 130 and may be able to communicate with external IP network 160. User device 110-A may activate a streaming application (signal 930). For example, user device 110-A may activate an Internet radio station service (e.g., Pandora Radio) provided by streaming device 170. Packet gateway 130 may forward the request to router 150 (signal 932) and router 150 may forward the request to streaming device 170 (signal 934).

Streaming device 170 may begin to send streaming data packets to IP address X.X.X.X via router 150 (signal 940). Router 150 may forward the streaming data packets to packet gateway 130 (signal 942) and packet gateway 130 may forward the streaming data packets to user device 110-A (signal 944).

At some later time, user device 110-A may lose the connection to packet gateway 130 without closing the streaming application (signal 950). Thus, streaming device 170 may continue to send streaming packet data to IP address X.X.X.X. Packet gateway 130 may detect the lost connection and may return IP address X.X.X.X to its IP address pool.

At some later time, user device 110-B may attach to access network 120. User device 110-B may perform a MAC authentication with HSS/AAA 140 (signal 960). Packet gateway 130 may assign IP address X.X.X.X to user device 110-B, by selecting IP address X.X.X.X from a pool of available IP addresses (signal 965). User device 110-B may now have IP connectivity with packet gateway 130 and may be able to communicate with external IP network 160.

AUMS 410, which may reside at packet gateway 130, may detect that IP address X.X.X.X is associated with a different MAC address (e.g., the MAC address associated with user device 110-B) than the MAC address previously associated with IP address X.X.X.X (e.g., the MAC address associated with user device 110-A). AUMS 410 may begin to monitor for streaming data packets destined for IP address X.X.X.X.

Streaming device 170 may continue to send streaming data packets to IP address X.X.X.X. (signal 970) and router 150 may continue to forward the streaming data packets to packet gateway 130 (signal 972). AUMS 410 may detect a streaming data packet and may send a signal to router 150 to drop packets from streaming device 170 destined for IP address X.X.X.X (signal 980). Streaming device 170 may continue to send streaming data packets for IP address X.X.X.X to router 150 (signal 990) and router 150 may drop the packet received from streaming device 170 and destined for IP address X.X.X.X (signal 995). Thus, packet gateway 130 may stop receiving the streaming data packets for IP address X.X.X.X. In one implementation, packet gateway 130 or router 150 may inform streaming device 170 to stop sending streaming data packets for IP address X.X.X.X (not shown in FIG. 9).

The foregoing description of implementations, described above, provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-8, the order of the blocks may be modified in other implementations. Further, non-dependent blocks may be performed in parallel.

Also, certain portions of the implementations may have been described as a "component" that performs one or more functions. The term "component" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a network device, the method comprising:
   obtaining, by a processor of the network device, an Internet Protocol address and a user device identifier associated with a user device;

determining, by the processor, that the obtained user device identifier does not match a previous user device identifier associated with the obtained Internet Protocol address;

monitoring, by the processor, packets destined for the obtained Internet Protocol address to determine whether the packets are associated with a streaming application, based on determining that the obtained user device identifier does not match the previous user device identifier;

detecting, by the processor, a packet destined for the obtained Internet Protocol address, where the packet is associated with a streaming application and where the packet is received from a particular network device; and signaling, by the processor, the particular network device to stop sending packets that are associated with the streaming application and that are destined for the obtained Internet Protocol address.

2. The method of claim 1, where the monitoring packets destined for the obtained Internet Protocol address includes monitoring User Datagram Protocol packets.

3. The method of claim 1, where the user device identifier includes a media access control address associated with the user device.

4. The method of claim 1, where the user device identifier includes an electronic serial number associated with the user device.

5. The method of claim 1, where the user device identifier includes a globally unique temporary identifier assigned to the user device by an access network.

6. The method of claim 1, where detecting packets that are associated with a streaming application includes examining headers of transport layer or application layer packets included in the packets destined for the obtained Internet Protocol address.

7. The method of claim 6, further comprising:
comparing information from the examined headers with information stored in a streaming applications memory that stores information associated with particular streaming applications.

8. The method of claim 7, where the streaming applications memory includes header information associated with the particular streaming applications or source Internet Protocol address information associated with particular streaming applications.

9. The method of claim 1, further comprising:
detecting a request from the user device to activate a streaming application;
determining that a signal has been sent to the particular network device to stop sending packets associated with the streaming application and destined for the Internet Protocol address associated with the user device; and
sending a signal to the particular network device to resume sending packets associated with the streaming application and destined for the Internet Protocol address, in response to detecting the request from the user device to activate the streaming application.

10. A network device comprising:
a memory to store instructions; and
a processor to execute the instructions to implement:
an adaptive User Datagram Protocol monitoring service to:
obtain an Internet Protocol address and a user device identifier associated with a user device;
determine that the obtained user device identifier does not match a previous user device identifier associated with the obtained Internet Protocol address;
monitor User Datagram Protocol packets destined for the obtained Internet Protocol address to determine whether the packets are associated with a streaming application, based on determining that the obtained user device identifier does not match the previous user device identifier;
detect a User Datagram Protocol packet destined for the obtained Internet Protocol address, where the User Datagram Protocol packet is associated with a streaming application and where the User Datagram Protocol packet is received from a particular network device; and
signaling the particular network device to stop sending packets associated with the streaming application and destined for the obtained Internet Protocol address.

11. The network device of claim 10, where the user device identifier includes a media access control address associated with the user device.

12. The network device of claim 10, where the user device identifier includes an electronic serial number associated with the user device.

13. The network device of claim 10, where the user device identifier includes a globally unique temporary identifier assigned to the user device by an access network.

14. The network device of claim 10, where, when the adaptive User Datagram Protocol monitoring service is to determine whether the packets are associated with a streaming application, the adaptive User Datagram Protocol monitoring service is to examine headers of transport layer or application layer packets included in the packets destined for the obtained Internet Protocol address.

15. The network device of claim 14, further comprising:
a streaming applications memory to store information associated with particular streaming applications; and
where the adaptive User Datagram Protocol monitoring service is further to compare information from the examined headers with information stored in the streaming applications memory.

16. The network device of claim 15, where the streaming applications memory includes header information associated with the particular streaming applications or source Internet Protocol address information associated with particular streaming applications.

17. The network device of claim 11, where the adaptive User Datagram Protocol monitoring service is further to:
detect a request from the user device to activate a streaming application;
determine that a signal has been sent to the particular network device to stop sending packets associated with the streaming application and destined for the Internet Protocol address associated with the user device; and
send a signal to the particular network device to resume sending packets that are associated with the streaming application and that are destined for the Internet Protocol address, in response to detecting the request from the user device to activate the streaming application.

18. A non-transitory computer-readable medium storing instructions executable by one or more processors, the non-transitory computer-readable medium comprising:
one or more instructions to obtain an Internet Protocol address and a user device identifier associated with a user device;

one or more instructions to determine that the obtained user device identifier does not match a previous user device identifier associated with the obtained Internet Protocol address;

one or more instructions to monitor packets destined for the obtained Internet Protocol address to determine whether the packets are associated with a streaming application, based on determining that the obtained user device identifier does not match the previous user device identifier;

one or more instructions to detect a packet destined for the obtained Internet Protocol address, where the packet is associated with a streaming application and where the packet is received from a particular network device; and one or more instructions to signaling the particular network device to stop sending packets associated with the streaming application and destined for the obtained Internet Protocol address.

19. The non-transitory computer-readable medium of claim 18, where the one or more instructions to monitor packets destined for the obtained Internet Protocol address includes one or more instructions to monitor User Datagram Protocol packets.

20. The non-transitory computer-readable medium of claim 18, where the user device identifier includes a media access control address associated with the user device.

* * * * *